United States Patent [19]

Richards

[11] 4,186,618

[45] Feb. 5, 1980

[54] TRANSMISSION INPUT DECELERATING AND REVERSING MECHANISM

[75] Inventor: Elmer A. Richards, Kalamazoo, Mich.

[73] Assignee: Eaton Corporation, Cleveland, Ohio

[21] Appl. No.: 822,174

[22] Filed: Aug. 5, 1977

[51] Int. Cl.² ............................................. F16H 3/38
[52] U.S. Cl. ................................... 74/339; 192/4 R; 92/31; 74/404; 74/411.5
[58] Field of Search ................... 192/4 A, 4 R; 92/31, 92/33; 74/411.5, 339, 404

[56] References Cited

U.S. PATENT DOCUMENTS

| 1,776,228 | 9/1930 | Coffman | 92/33 |
| 2,559,740 | 9/1952 | Sinclair | 74/334 |
| 2,883,144 | 4/1959 | Kendig | 92/33 |

FOREIGN PATENT DOCUMENTS

1263278  5/1961  France ........................................ 74/339

Primary Examiner—Samuel Scott
Assistant Examiner—G. A. Anderson
Attorney, Agent, or Firm—R. J. McCloskey; H. D. Gordon

[57] ABSTRACT

A mechanism for selectively and/or automatically decelerating and positively reversing the normal direction of rotation of a rotatable shaft is provided. The mechanism includes a member which is meshingly engaged to a shaft driven by a one-way drive, such as the input shaft of a change gear transmission driven by a Diesel engine, and is operable to decelerate the shaft and positively rotate the shaft in the opposite direction of rotation.

15 Claims, 9 Drawing Figures

TRANSMISSION INPUT DECELERATING AND REVERSING MECHANISM

BACKGROUND OF THE INVENTION

1. Field of the Invention

This invention relates to a mechanism for selectively and/or automatically decelerating and positively reversing the normal direction of rotation of a rotatable shaft and in particular relates to a mechanism for selectively and/or automatically decelerating and positively reverse rotating the input shaft of a change gear transmission driven by a one-way prime mover through a friction master clutch.

2. Background of the Invention

In the design of transmissions, particularly heavy duty transmissions, such as used in trucks, there has existed for a long time the problem of shifting the transmission to the various speed ratios, which problem is even greater when the transmission is provided with an auxiliary transmission section of the range or the splitter type for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its costs. Hence, without detracting in any way from the operability or desirability of many of the shifting mechanisms previously known, it may be stated that in the present invention these general objectives are accomplished to even a greater degree than has been previously possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible.

These and other problems incident to previously known transmissions were set forth and acknowledged in U.S. Pat. Nos. 3,799,002, entitled "TRANSMISSION WITH RESILIENTLY LOADED MAIN SHAFT GEARS"; 3,910,131, entitled "TRANSMISSION WITH SNAP SHIFT", 3,921,469, entitled "TRANSMISSION WITH RESILIENTLY LOADED MAIN SHAFT GEARS"; 3,924,484, entitled "SENSOR UNBLOCKING RAMPS"; and 3,983,979, entitled "SENSOR UNBLOCKING RAMPS"; all hereby incorporated by reference and all issued to the present applicant and assigned to the same assignee as the present application. Apparatus is disclosed in the above mentioned patents which effectively meets the problems while providing a reliable, effective and efficient transmission, particularly for heavy duty use.

While both forms of the inventions disclosed in said patents, namely, those using blockers and those not using blockers, are effective for carrying out the objectives thereof, it has been noted that for the usual reasons both noise and clutch tooth wear can be minimized by the use of blockers as set forth in said patents and since the date thereof a considerable amount of investigation has been carried out related thereto, both for simplifying of the blocker structure and for improving the operation of said blockers and of transmissions utilizing same. Blockers of various types are well known in the prior art and examples thereof may be seen by reference to the above mentioned patents and to U.S. Pat. No. 3,503,280, entitled, "BLOCKER DEVICE", issued to W. C. Bopp, and assigned to the assignee of this application.

Blockers of the type illustrated in the above mentioned patents are generally nondeformable devices designed to prevent, or block, the engagement of the axially engageable jaw clutch members of a jaw clutch when said members are rotating at substantially different speeds, i.e., are not substantially synchronized. Transmissions utilizing such blockers are referred to herein as "blocked transmissions." Blocked transmissions are transmissions utilizing blockers to prevent jaw clutch engagement if the members of the jaw clutch was not substantially synchronized. This is in contrast to "synchronized transmissions" which utilize synchronizer clutches to cause the jaw clutch members to be synchronized. The relatively nondeformable blockers utilized with many of the prior art blocked transmissions are generally retained on one clutch member for rotation therewith with a limited amount of relative rotation (3°–15°) provided. The blocker and the one clutch member will define an array of projections or the like which will allow the one clutch member to move relatively axially towards the other clutch member when in alignment but will block such relative axial movement when said blocker is rotated in either the clockwise or counterclockwise direction relative to the one clutch member. The blocker is designed to be in positive frictional contact with the second clutch member during an engaging operation as will thus tend to rotate with the second clutch member. Random frictional contact will usually cause the blockers to rotate with the second clutch members at times when a clutch engagement is not attempted.

By way of example, assuming the use of a relatively nondeformable blocker as disclosed in the above mentioned prior art and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotates faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such movement of the clutch members and the blocker is generally referred to as "passing through synchronous." The clutch will "pass through synchronous" or "cross synchronous" as the two clutch members reach a substantially synchronous rotation, and the clutch engaging operation, or the gear shift, should be completed at this time. As the blocker is designed to be in positive frictional contact with the second clutch member only during a clutch engaging operation to prevent undue frictional wear, it is possible, under certain conditions, that the blocker can be set up on the "wrong side of synchronous" at the initiation of a clutch engaging operation, i.e., referring to the above example, rotated clockwise relative to the first clutch member when the first clutch member was rotating faster than the second clutch member or vice versa. Under such conditions, especially if the driven device is stopped, it is difficult or impossible to cause the blocker to "pass through synchronous" and the transmission cannot, without undue manipulation, be shifted into the desired gear ratio.

In a blocked transmission the blocked clutch members have an inherent problem of achieving engagement under certain static conditions, i.e., when the driven device is standing still. When a blocked transmission of the twin countershaft type as is illustrated in U.S. Pat. Nos. 3,799,002 or 3,924,484 is in neutral with the master clutch engaged, the gearing will, for at least a period of time, rotate while the output or main shaft is stationary. This tends to place the blockers in the "upshift position", i.e., that position associated with a dynamic upshift wherein the jaw clutch member rotating with the main shaft must be rotated faster than the clutch member rotating with the gearing to cause the clutch to pass through synchronous. When the gearing comes to a stop, the blockers remain in the "upshift position" and, because it is difficult to rotate the main shaft with the transmission in neutral, a reversing of the gearing or an auxiliary aligning of the blockers is required to achieve a clutch engagement.

In compound, blocked transmissions of the type seen in U.S. Pat. Nos. 3,799,002 and 3,924,484, relative overspeeding of the auxiliary transmission gearing by the main shaft can be achieved by the operator momentarily shifting the transmission from neutral into reverse as reverse gear is normally not a blocked gear. But this is obviously an inconvenience, a highly undesirable technique, and might hamper the commercial acceptability of an otherwise highly successful transmission.

Various types of self-aligning blockers, when utilized with an input shaft brake, are an effective auxiliary method of obtaining clutch engagement at a static condition. However, due to manufacturing, space, cost and operational considerations, an improved means for achieving static clutch engagement is desirable.

Another requirement of a blocked transmission of the type seen in U.S. Pat. Nos. 3,799,002 and/or 3,924,484 is a means for decelerating the input of the transmission, especially to achieve upshifts into the lower gear ratios on a grade. In such situations, when the master clutch is disengaged, the decelerating means must decelerate the input shaft at a rate sufficient to cause the output shaft, which on a grade will also be rapidly decelerating, to rotate faster than the input shaft.

Input brakes have been utilized in the past to decelerate the input shaft of transmissions and have been highly effective. However, input brakes will not provide a solution to the problem of jaw clutch engagement under static conditions.

A blocked, fluid flywheel transmission utilizing a shaft brake for the stated purpose of stopping and reversing a shaft is mentioned in U.S. Pat. No. 2,304,375 issued Dec. 8, 1942. However, this device is believed to simply involve a brake with no means to actually reverse a shaft being disclosed or illustrated.

It may also be desirable to provide a means for circulating transmission oil through an oil cooler to lower transmission operating temperatures. Various types of oil pumps and oil coolers are, of course, well known in the prior art.

SUMMARY OF THE INVENTION

In accordance with the present invention, many of the drawbacks of the prior art have been overcome by the provision of a mechanism for decelerating and momentarily positively reverse rotating a rotatable shaft, such as a transmission input shaft, normally driven in only one direction. The mechanism may also include structure sufficient to pump coolant and/or lubricant.

The mechanism comprises a friction disc pack in which one set of discs is driven by a member, preferably a gear adapted to be in constant mesh with the input gearing of the transmission. The other set of discs of the disc pack is carried by a reaction member. The reaction member is actuated by an axial force member, such as an air piston. The force of the piston is transmitted to the reaction member by an actuation shaft which carries the reaction member by a generally helical spline. The actuation shaft and piston are grounded to the mechanism housing by a straight spline to prevent rotation of the actuation shaft and piston relative to the housing. A return spring acting on the actuation shaft maintains running clearance in the disc pack when the device is not actuated. The number of discs and the helix angle of the actuation shaft spline are selected so that the torque from the disc pack is greater than the counteracting torque from the helix.

In the example of a blocked transmission utilizing the mechanism of the present invention, the air piston is preferably actuated by a full depression of the master clutch pedal in a manner similar to actuation of prior art input shaft brakes and thus little or no driver training will be required.

When the master clutch is disengaged, air directed to the air piston will cause the actuation shaft to move the reaction member towards the disc pack. Since the torque capacity of the disc pack is greater than the counteracting helix torque of the splines, axial movement of the actuation shaft will result in a further axial force applied to the disc pack rather than in rotation of the reaction member. Such an application of torque will cause the one set of clutch discs to be decelerated, decelerating the transmission input shaft for upshifts on a grade and/or rapid upshifts. Assuming a gear engagement preselection has been made, as the selected jaw clutch crosses synchronous, the shift will be accomplished.

If the shift is attempted at static conditions, the disc pack will lock up and the full stroke of the piston and actuation shaft, acting through the helical spline, will cause positive reverse rotation of transmission input shaft. If a gear ratio preselection has been made, reversing the input shaft will cause the selected jaw clutch members to cross synchronous and the preselected shift will be accomplished. If a preselection has not been made, the reverse rotation of the input shaft will, due to random drag between the blocker and the second clutch member, tend to cause the blockers to set up in the "downshift" position so that shift may easily be accomplished from a static condition. The stroke of the air piston should be sufficient to cause a relative overspeeding of all auxiliary and main transmission gearing by the main shaft if necessary.

The mechanism is preferably designed to be mounted on the underside of the transmission and will, thus, be immersed in oil. A suitable pumping chamber and mating gear pump idler gear may be provided to achieve a gear pump oil pumping function.

The mechanism is preferably self contained and designed to be attached at one of the power takeoff openings of the transmission housing. A timer circuit may be employed to limit the actuation cycle of air piston to prevent misuse of the mechanism as a vehicle retarder or the like.

Accordingly, it is an object of the present invention to provide a mechanism adapted to selectively and/or automatically decelerate and momentarily positively reverse rotate a rotatable shaft normally driven in only one direction.

These and other objects and advantages of the present invention will become apparent from a reading of the detailed description of the preferred embodiment taken in view of the accompanying drawings.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above mentioned patents and reference is therefore made thereto for such details.

Figure 1:
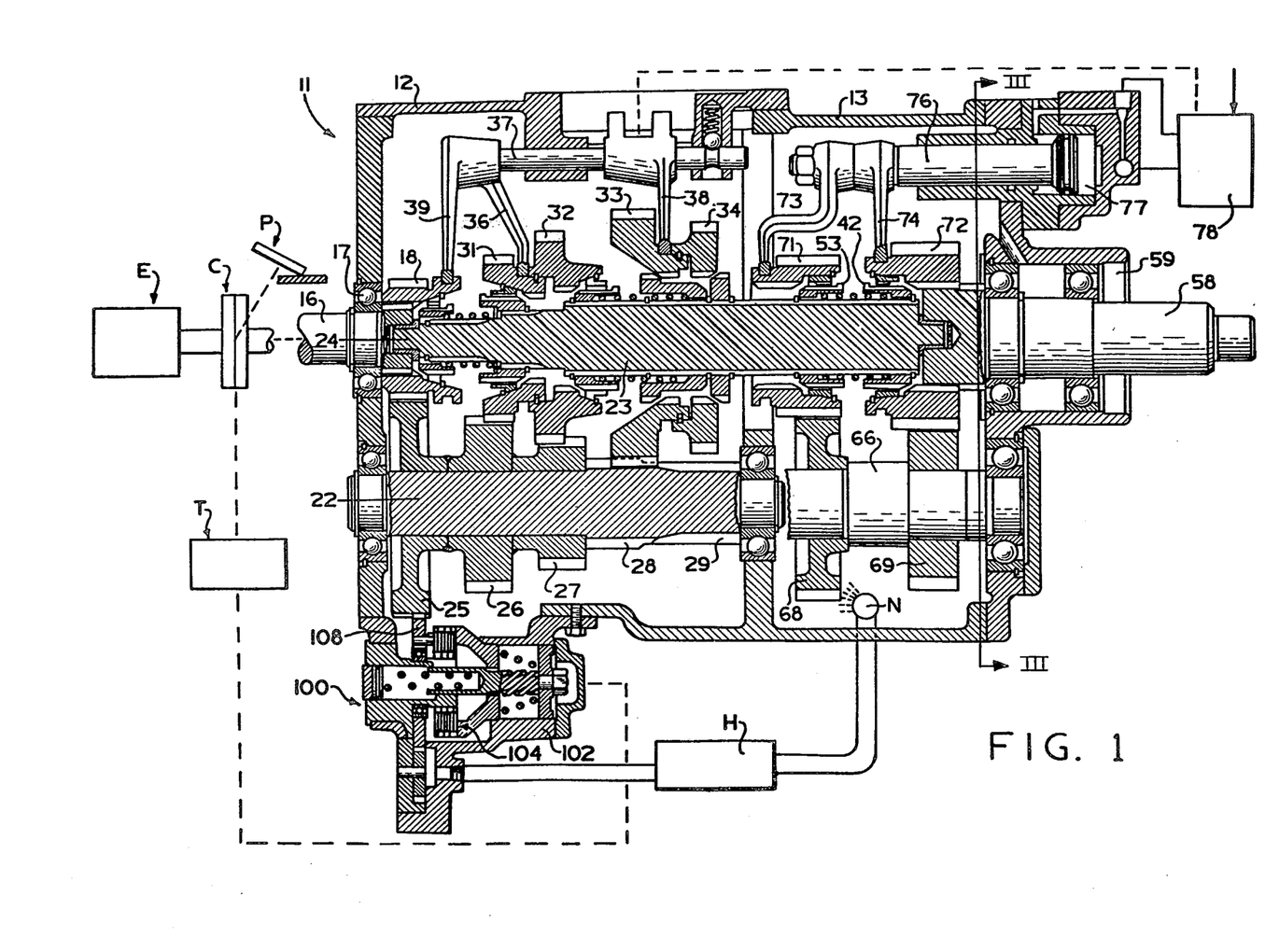
FIG. 1 is a cross-sectional view of a splitter type, blocked, compound transmission utilizing the mechanism for decelerating and momentarily reverse rotating a shaft, in this example the transmission input shaft, of the present invention. The main transmission portion being taken along the line I—I of FIG. 3 and the auxiliary transmission portion being taken along the line I—IA of FIG. 3.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof, and words of similar import.

The term "simple transmission" is used to designate a change speed transmission wherein the operator may select one of a plurality of single gear reductions. The term "compound transmission", is used to designate a transmission having a main transmission portion and an auxiliary transmission portion whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps of the gear ratio selected in the main transmission portion. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission, i.e., that set of gears having the highest ratio of reduction relative to the input shaft of the transmission.

The term "blocked transmission" shall designate a change gear transmission wherein a selected gear is nonrotatably coupled to a shaft by means of a positive clutch and a blocker is utilized to prevent such engagement until the members of the positive clutch are at synchronous, such synchronous condition achieved by manual and/or automatic manipulation of the transmission input and/or output shafts to cause said shaft to cross synchronous but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is nonrotatably coupled to a shaft by means of a positive clutch, attempted engagement of said clutch is prevented until the members of the clutch are at synchronous and frictional means associated with clutch members are sufficient, upon initiation of a clutch engagement, to cause the clutch members, and all members rotating therewith, to rotate at a substantially synchronous speed of rotation.

The mechanism for decelerating and momentarily positively reverse rotating a rotatable shaft, such as a transmission input shaft, of the present invention is illustrated in connection with a resiliently shiftable change speed transmission of the type having a floating main shaft and a plurality of substantially identical countershafts as may be seen in more detail by reference to the above mentioned U.S. Pat. No. 3,799,002. Although the improved transmission utilizing the mechanism of the present invention is illustrated in connection with such a resiliently shiftable change speed transmission, it is understood that the improved mechanism of the present invention may be utilized with any type of blocked axially engageable jaw clutch structure utilizing relatively nondeformable blockers.

Insofar as concerns the integration of the relatively nondeformable blockers into the improved shiftable change speed transmission system of the present invention, the blockers are placed between the two relatively axially slidable portions, or members, of at least one and preferably most or all of the transmission positive clutches and the usual friction means are provided for causing the blockers to tend to rotate with one of said members as the clutch members respectively move toward each other during a clutching procedure. One of said clutch members is often formed integrally with a main shaft gear as internal clutch teeth thereof. As the clutching procedure occurs, the blocker limits such relative axial movement until substantial synchronization between the clutch members involved in a given shift is sensed.

The blockers of the present invention, and the other clutch elements of a given clutchable pair of clutch members, are typically provided with slightly angling leading spaces on the blocker teeth to effect an easier unblocking when the main shaft is otherwise unconnected to any other main shaft gears and hence at a minimum inertia. The angling of said blocker teeth is, however, insufficient to effect unblocking during a normal shift and hence will not interfere with the required function thereof during a normal shift. As may be seen by reference to U.S. Pat. Nos. 3,921,469 and 3,924,484, both above mentioned, there may further be provided means by which a significant axial drag with a minimum of rotational drag is provided constantly between the blocker ring and the clutch member blocked thereby. Thus, said blocker rings will be axially urged upon axial movement of said last named clutch element into engagement with the driving cone of the other clutch element and will thereby be held in proper position against the effect of its own inertia with respect to the gear associated therewith. This assures that, in most operating situations, the blocker rings will be in the desired position prior to contact with the blocking surface of the clutch.

The blocker elements also contain advantageous features in that there is required removal of only one portion of one tooth of a clutch member and the blocker ring is provided with a pair of teeth or projections extending toward the clutch element from which a part of said one tooth has been removed. Said teeth are of sufficient circumferential spacing to straddle the remaining portion of said one tooth when synchronization is achieved for effecting an unblocking condition but at least one of said blocker teeth are themselves of circumferential dimension less than the spacing between the teeth on said clutch element for permitting circumferential shifting thereof in at least one direction and the creation of a blocking condition.

Referring now to the drawings, there is illustrated a resiliently shiftable, change speed blocked transmission 11 having both a main transmission section 12 and an auxiliary transmission 13, each of which have a plurality of selectable ratios. The transmission illustrated is generally referred to in the art as a compound transmission and is of the splitter type of compound transmission. The main and auxiliary sections are both suitably enclosed by conventional housing means.

The blocked transmission 11 includes an input shaft 16 supported adjacent its rearward end by a bearing 17 and is provided with an input gear 18, nonrotatably connected thereto, as by splines. The input gear 18 simultaneously drives a plurality of countershafts at equal speeds. In the illustrated embodiment, the transmission is provided with two countershafts, 21 and 22, disposed on diametrically opposite sides of the main shaft 23, which main shaft is coaxially aligned with the input shaft 16 and is provided with a pilot portion 24 on its forward end rotatably received within and supported by the rearward end of the input shaft 16.

The input shaft 16 is normally driven in one direction only by a primemover, such as a Diesel engine E through a selectively operated, normally engaged, friction master clutch C. Clutch C may be disengaged by use of pedal P as is known in the prior art.

Each of the countershafts 21 and 22 is provided with an identical grouping of countershaft gears, 25, 26, 27, 28 and 29 thereon, which groupings form pairs of gears, such as the pair of gears 26, of identical size and number of teeth and disposed on diametrically opposite sides of main shaft 23.

A plurality of main shaft drive gears 31, 32, 33 and 34 encircle the main shaft and are selectively clutchable thereto one at a time by yieldable clutch mechanisms, as described in greater detail hereinafter and in the above incorporated patents.

The main shaft gears, 31, 32 and 33, encircle the main shaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and hereby incorporated by reference. The main shaft gear 34 is the reverse gear and is in continuous meshing engagement with a pair of countershaft gears 29 by means of conventional intermediate gears (not shown). The forwardmost countershaft gears 25 are continually meshed with and driven by the input gear 18 for causing simultaneous rotation of the countershafts 21 and 22 whenever the input shaft is rotatably driven. As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft 23.

Mainshaft gears 31, 32, 33, and 34, countershaft gears 25, 26, 27, 28 and 29, and the intermediate gear are all constantly meshed with and driven by the input gear 18 and thus, in combination, form the input gearing of the transmission 10.

The main shaft gears 31 and 32 are axially interconnected to form a gear pair and are connected to a conventional shift fork 36. The position of the shift fork 36 being controlled in a conventional manner by means of appropriate shift rods similar to rod 37. The main shaft gear pair 31-32 is this shiftable axially relative to main shaft 23 in response to axial shifting of the fork 36 by said rod. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by appropriate shift means. The main shaft gear pair 33-34 is likewise and similarly axially movable relative to the main shaft 23 and independently rotatable.

Figure 3:
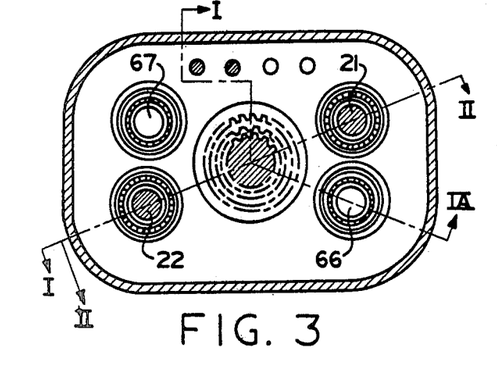
FIG. 3 is a sectional elevational view taken along the line III—III of FIG. 1.

Considering now the splitter auxiliary section 13, the main shaft 23 extends thereinto and is coaxially arranged with and piloted into an output shaft 58 which is in turn supported within the housing 13 by suitable bearings generally indicated at 59. Said auxiliary section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with the main shaft gear 71, which main shaft gear is floatingly supported by the forward pair of countershaft gears, one being the geat 68 for substantially consecutively encircling the main shaft 23. A further main shaft gear 72 is also floatingly and substantially consecutively supported relative to the main shaft 23 by the rearward pair of countershaft gears, one being the gear 69. Shift forks 73 and 74, respectively, are provided for effecting the shifting of gears 71 and 72 and said shift forks are operable by appropriate shift rods of which one appears at 76 for operation by any desired means such as the pressure cylinder 77. Appropriate control means 78, a presently known type, is provided for properly effecting and interrelating control of the shift means for the forward gears 18 and 31-34 and the splitter gears 71 and 72.

A mechanism 100 is provided for selectively and/or automatically decelerating and momentarily reverse rotating the input shaft 16 and the gearing driven thereby. The mechanism 100 may also be provided with means to pump oil and/or coolant for purposes of positive lubrication and/or cooling of the transmission.

Mechanism 100 is preferably enclosed in a housing 102 which allows the mechanism to be assembled to and/or disassembled from the transmission 11 as a fully assembled subassembly. Preferably, the mechanism 100 may be assembled to the transmission 11 at one of the standard power takeoff (PTO) openings or the like.

Figure 2:
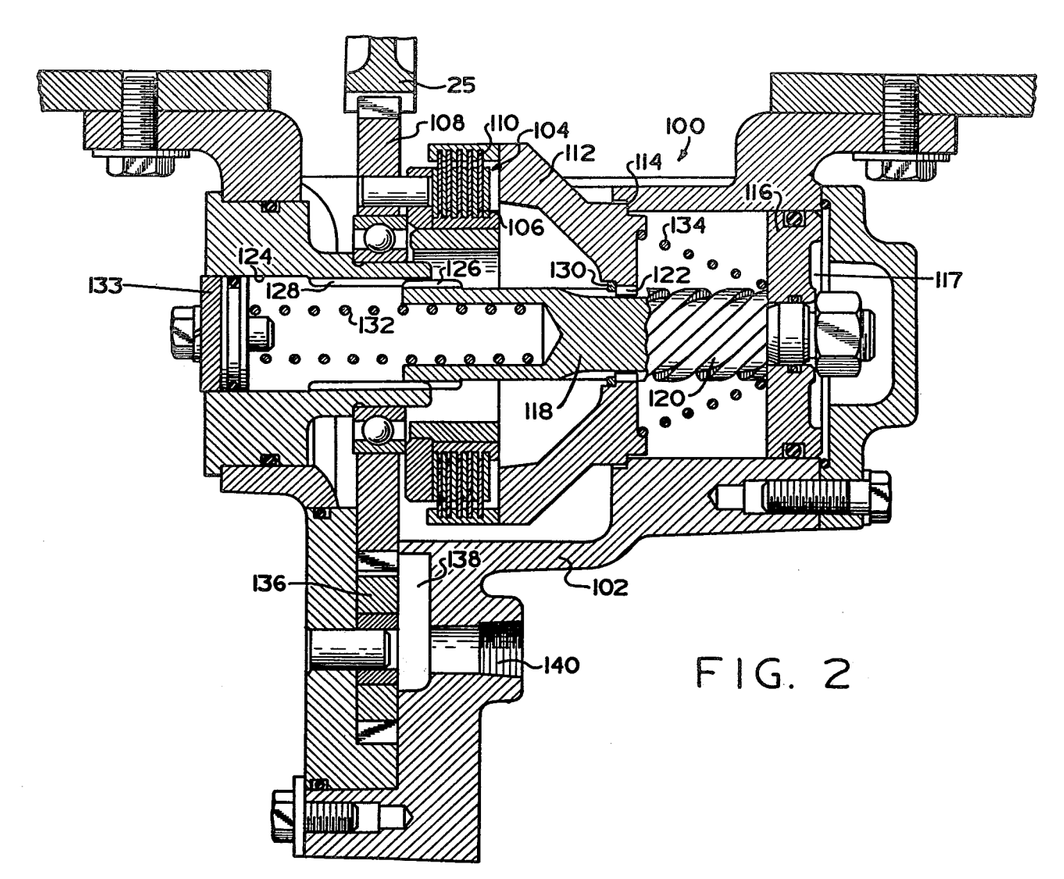
FIG. 2 is an enlarged cross-sectional view of the mechanism of the present invention for selectively and/or automatically decelerating and momentarily positively reversing the direction of rotation of a rotatable shaft normally rotated in one direction only.

The detailed structure of mechanism 100 is illustrated in FIG. 2 and will be described in greater structural and operational detail below.

The yieldable clutch structures are arranged between the shiftable main shaft gears in both the main transmission and the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between the main shaft gear 72 and the main shaft 23 in the auxiliary transmission section, said jaw clutch unit is generally designated 41 and includes an annular clutch collar or clutch member 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therebetween. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the leftward axial movement thereof. The collar 42 is normally resiliently urged by means of a spring 47 into a butting engagement with the stop ring 46.

The clutch collar 42 is provided with external teeth 48 thereon which are adapted to meshingly engage the internal teeth 50 provided on one of the main shaft gears, such as gear 72, the internal teeth 50 form the other member of clutch 41. The teeth 48 on the clutch collar 42 are tapered, as at 51, and in a similar manner the leading edge of the teeth 50 on the main shaft gear 72 are similarly tapered at 52. The tapered conical surfaces 51 and 52 each extend at an angle of preferably between 30° and 40° relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of teeth facing in the opposite direction.

Further resilient, substantially identical, clutch assemblies are provided for the other shiftable gear sets but same are set forth in detail in the above incorporated patents and hence further description thereof is unnecessary here.

Figure 4:
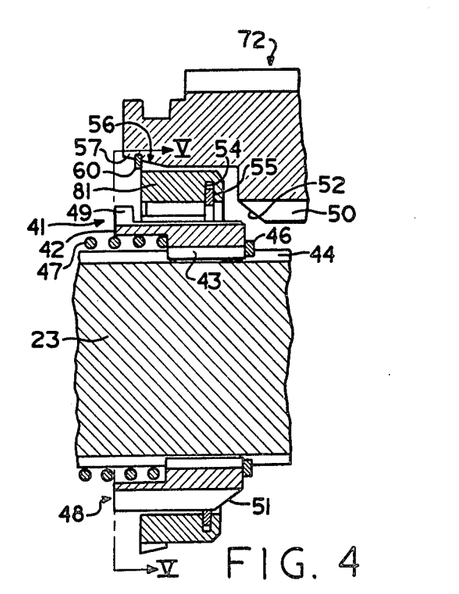
FIG. 4 is an enlarged fragmentary view of the jaw clutch structure utilized in connection with blockers in the improved transmission of the present invention.

Referring to FIG. 4, a selected number, here three, of the teeth 48 are partially removed for permitting the presence of a blocking ring as hereinafter further described. Such partial removal leaves, however, a shortened tooth 49 for cooperation with the blocking ring.

Referring now to the relatively nondeformable blockers, which are illustrated in FIGS. 5 through 8, one thereof is indicated generally at 81, and comprises a ring encircling the clutch member 42 and has an appropriate number, here three pairs, of radially inward projections 82 and 83, which when properly positioned will mate with the external teeth above mentioned. The inward projections or teeth 82 and 83 are contoured at their sides to lie snugly against the adjacent ones of the teeth 48, are positioned to project into the spaces between a partially removed tooth 49 and the teeth 48 on each side thereof. Each pair of teeth 82 and 83 are circumferentially of less dimension than the corresponding circumferential spaces defined by partially removing teeth 49 and thus blocker ring 81 may be rotated in either a limited clockwise or counterclockwise direction relative to clutch member 42 from the position seen in FIG. 5 in which the space between teeth 82 and 83 aligns with partially removed tooth 49. Contact of either blocker tooth 82 or 83 by a clutch tooth 48 will limit such relative rotation and cause blocker 81 to rotate with clutch member 42. The space, however, between the inwardly projecting teeth 82 and 83 is of a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch member 42 can move axially through but not past blocker ring 81 to effect engagement with its corresponding clutch member integrally formed in a corresponding gear. As may be seen by reference to FIG. 8, the end faces of the blocker teeth 82 and 83 may be tapered.

As is described in greater detail by reference to U.S. Pat. Nos. 3,921,469 and 3,924,484, the radially inner side of ring 81 may be provided with an inwardly directed groove 54 which receives an annular resilient ring 55 which is normally of slightly less internal diameter than the external diameter of the teeth 48 so that when the parts are in the assembled condition, ring 55 is distorted slightly outwardly thereby to exert a light but definite pressure against the external surface of said teeth 48. Inasmuch as the ring 55 fits loosely and only in light frictional contact with the walls of the groove 48, this effects a significant resistance to axial movement between the blocker ring 81 and the clutch ring 48 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drive above mentioned is sufficient that the rotative driving effect of the surface 57 onto the blocker 41 is much greater than whatever rotative resistance may exist between the blocker 81 and the clutch member 42. A stop ring 60 limits movement of the blocker 81 away from the conical surface 57 when the clutch ring 42 moves out of engagement (leftwardly in FIG. 4).

The other two partially removed teeth corresponding to tooth 49 are indicated at 49A and 49B and internally extending teeth on the blocker ring corresponding to the teeth 82 and 83 are indicated at 82A and 83A for cooperation with the partial tooth 49A and at 82B and 83B for cooperation with the partial tooth 49B.

The operation of the blocker 41 is generally similar to that of known generally nondeformable blockers, and in particular is substantially identical to those nondeformable blockers described in U.S. Pat. No. 3,924,484. For example, assuming the gear 72 is rotating more rapidly than the clutch member 42, which, of course, rotates at the same speed as the main shaft 23, the blocker 81 will normally (ignoring for the moment the effect of the ring 55) tend to rotate with the gear 72, hence, lead the clutch member 42 and position the teeth 83, 83A, and 83B, in a position to interfere with the partial teeth 49, 49A, and 49B, respectively, to prevent axial clutching movement of the clutch component to the right. However, as the shaft 23 accelerates and a condition of synchronism is approached, the space between the inwardly projecting blocker teeth will become substantially centered with the partial teeth on the periphery of the clutch member 42 and upon reversal of the relative speeds, the blockers will no longer block and the clutch member 42 will move into clutching engagement in the usual manner.

With the gear 72 initially running slower than the shaft 23, the operation will be generally similar to that described above excepting that the blocker 81 will lag behind the clutch member 42 until there occurs a reversal of relative speeds, i.e., a passing through synchronous, at which time blocking will cease and clutching will again be completed in a manner already well known for blocking devices.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch member 42 commences to move axially rightwardly, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring, the blocking ring 81 commences rotating with the gear 72 and does so prior to contact between the teeth of the blocker 81 and teeth of the clutch member 42.

Blocked transmissions, such as transmission 11 described above, utilizing substantially nondeformable blockers which are operable to block or permit a jaw clutch engagement dependent upon the rotative position of the blocker relative to one of the jaw clutch members are a considerable improvement over prior art devices. However, such blocked transmissions have inherently required auxiliary mechanism and/or operational procedures to achieve satisfactory gear engagement under certain conditions such as rapid upshifting when maximum acceleration of the vehicle is required, upshifting when the vehicle is traveling uphill on a grade and/or when the vehicle is to be shifted from neutral into a drivegear when the vehicle is at rest.

Severe operating conditions and/or the use of noise shrouds may necessitate a means to circulate lubricant and/or coolant under pressure for positive lubrication and/or cooling of the transmission.

Rapid upshifting of the transmission and upshifting of the transmission when the vehicle is traveling uphill on a grade requires that the input shaft 16 and the gearing driven thereby decelerate faster than the output or main shaft to allow the selected clutch members to pass through synchronous. Under the above conditions, the normally sufficient means to decelerate the input shaft, namely engine resistance and rotating friction of the shafts and gears, will not decelerate the gearing as fast as the output or main shaft is decelerated. A selectively and/or automatically operated auxiliary means to decelerate the input shaft and gearing driven thereby is thus required.

Figures 5, 8:
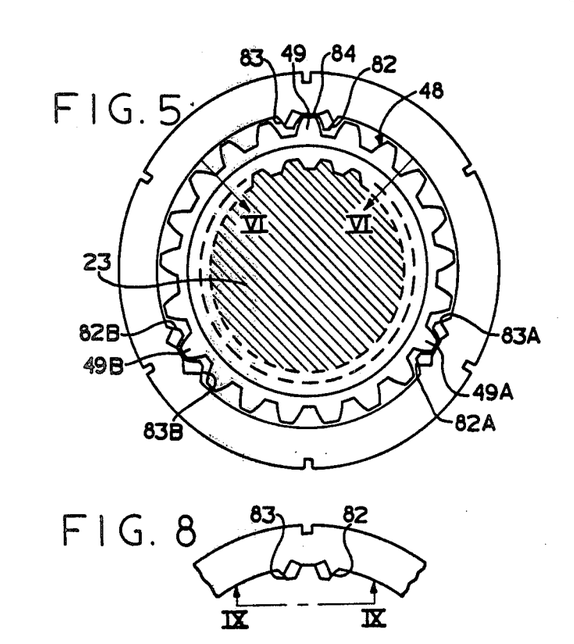
FIG. 5 is a sectional view of a jaw clutch and blocker structure.
FIG. 8 is a view taken in the direction of the arrows VIII—VIII in FIG. 7.
Figure 6:
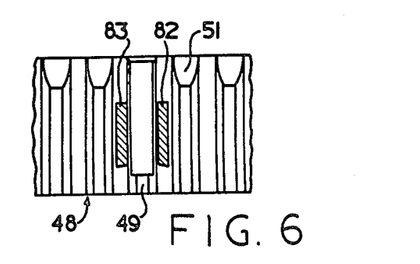
FIG. 6 shows the components of the blocker fragmentarily in synchronous condition permitting shifting.
Figure 7:
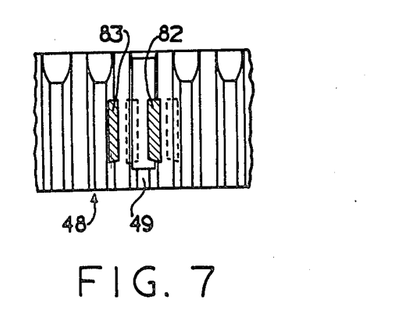
FIG. 7 is an enlarged fragmentary detail of the blocker ring teeth taken from the same direction as shown in FIG. 5.
Figure 9:
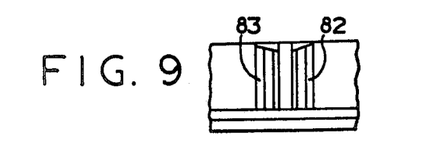
FIG. 9 is a view taken in the direction of the arrows IX—IX in FIG. 8.

As a blocked transmission is placed in neutral with the vehicle stopped, motion of the gearing and random frictional contact between the gearing and the blockers will usually tend to place the blockers in the upshifting position. Thus, for example, if the gear 72 and main shaft 23 are rotating in clockwise direction as seen in FIG. 5, blocker ring 42 will be rotated clockwise relative to clutch member 81. To achieve a crossing of synchronous, the gear 72, which the blocker ring 42 will tend to rotate with, must be caused to rotate counterclockwise relative to the main shaft 23. Such a relative rotation will occur only if the main shaft is rotated faster than the gearing or if the input shaft and gearing is rotated in the reverse (counterclockwise) direction. As, at neutral, it is difficult or impossible to rotate the output shaft faster than the input shaft and gearing especially in the main transmission section 12, a means for selectively and/or automatically positively reverse rotating the input shaft 16 and gearing driven thereby is required.

The above requirements for a selectively and/or automatically actuated means for decelerating and positively reverse rotating the transmission input shaft 16 and the gearing driven thereby are filled by mechanism 100 illustrated in FIGS. 1 and 2.

Mechanism 100 includes a housing 102 which may be designed to be bolted onto the transmission housing 12 or may be formed integrally with the housing. Preferably, the mechanism 100 will attach to transmission housing 12 below the sump level of the transmission and will, thus, be filled with transmission lubricant and/or coolant.

Mechanism 100 comprises a friction disc pack 104 in which one set of discs 106 is driven by a member 108, preferably a gear, in mesh with the input gearing of the transmission, here countershaft gear 25. The other set of interdigitated discs 110 is carried by a reaction member 112. The reaction member 112 is limited in its movement away from the disc pack 104, to the right, by a shoulder 114 formed in housing 102 and may be moved toward the disc pack 104, to the left, by an axial force transmitting member such as an air piston 116. Of course, other types of axial force transmitting means such as an hydraulic piston or an electromagnetic solenoid may be utilized.

The axial force of the air piston 116 is transmitted to the reaction member 112 by an actuation shaft 118 which carries the reaction member in a plurality of generally helical external splines 120 which mate with corresponding internal helical splines 122 formed on the reaction member. The helix angle of the splines is preferably about 45°, or in the range of 30-60 degrees, with respect to the axis of the actuation shaft. The actuation shaft 118 is slidingly received in a bore 124 of the housing 102. A plurality of axially extending external splines 126 formed on the actuation shaft mate with corresponding axially extending internal splines 128 formed in the housing bore 124 to prevent rotation of the piston 116 and actuation shaft 118 relative to the housing 102. A snap ring 130 or the like is utilized to limit leftward movement of reaction member 112 relative to the actuation shaft 118. A return spring 132 seated on a spring seat 133 received in the left end wall of housing 102 biases the actuation shaft 118 to the right to provide a running clearance in the disc pack 104 when the air piston 116 is not actuated. A relatively lighter spring 134 is used to bias the reaction member to the left. A torque reaction strap (not shown) is bolted to housing 102 and received in a groove formed in the member carrying the splines 128 to prevent rotation of said member.

As the mechanism is preferably designed to be mounted on the underside of transmission 11, it will be immersed in transmission lubricant and/or coolant. A shrouded idler gear 136 in mesh with the gear 108 may be provided in a chamber 138 having a suitable lubricant outlet 140. Placing of the shrouded idler gear 136 in a suitable gear pump chamber, as is well known in the prior art, in mesh with gear 108 provides a positive displacement gear pump which can be utilized for circulating coolant and/or lubricant oil under pressure for cooling and/or positive lubrication of the transmission 11. As most coolers H have a relatively low resistance to flow, the dimensions and efficiency of the pump may not be critical.

The number of discs 106 and 110, the friction materials thereof, and the helix angle of the helical splines are selected so that the torque required to slip the friction discs of the disc pack 104 exceeds the counteracting torque from the helix spline, thus, movement of reaction member 112 towards the friction disc pack 104 will cause the disc pack 104 to lock up rather than discs 110 rotating relative to disc 106.

As may be seen by reference to FIG. 1, the mechanism 100 may be automatically and/or selectively actuated in any well-known manner. Preferably, the full depression of pedal P to disengage master clutch C will be effective to actuate a valve (not shown) to supply pressurized air to the chamber 117 to the right of air piston 116. A timer control T may be utilized to limit the duration of time air is supplied to chamber 117 to prevent the mechanism 100 from being misused as a retarder or the like.

Further, should a shrouded idler gear 136 be utilized in a pumping chamber 138 with an outlet 140, suitable heat exchange means, such as oil cooler H, and lubricator outlets, such as nozzle N, may be provided.

In operation, assuming input shaft 16 is driven by a conventional Diesel engine, it will be rotated by the engine in the counterclockwise direction only, looking from the front of the vehicle. Countershaft 22 and gears 25, 26, 27, 28 and 29 normally rotate in the clockwise direction, main shaft gears 31, 32, 33, 71 and 72 normally rotate in the counterclockwise direction and gear 108 of the mechanism 100 and the discs 106 carried thereby will be rotated in the counterclockwise direction.

Should a rapid upshift, or an upshift on a grade be required, the mechanism 100 will be actuated by full depression of master clutch pedal P. It is noted that should operation of mechanism 100 not be desired during a gear change, the master clutch may be disengaged by a partial depression of pedal P. This is similar to the operation of a standard input shaft brake and, thus little or no driver training should be required. The control will operate a valve to cause pressurized air to be introduced into chamber 117 behind air piston 116 to move the piston 116, actuation shaft 118 and reaction member 112 toward disc pack 104. The relatively lighter spring 134 will cause initial engagement of the disc pack 104 while continued movement of piston 116 and actuation shaft 118 will cause reaction member 112 to apply an axial force to the disc pack to decelerate the countershaft gear 25 and the input shaft and gearing in constant meshing engagement therewith. Snap ring 130 prevents leftward movement of reaction member 124 relative to the actuation shaft 118. As the input gearing, including the main shaft gears, are decelerated to rotate slower than the main shaft 23, the selected jaw clutch will pass through synchronous and the selected gear ratio will be engaged. The air piston 116 is sized, of course, such that the inertia of the free wheeling gearing, as applied through the helical splines 120-122 will not easily overpower the air piston without a significant deceleration of the input gearing.

Should a shift from neutral into gear at static conditions, i.e., when vehicle is standing still, be required, the operator will again fully depress pedal P to charge the chamber 117 behind piston 116 causing the piston 116, the actuation shaft 118 and the reaction member 112 to be carried to the left towards the friction disc pack 104. Initially, the disc pack 104 will lock up and then the stroke of the piston 116 and actuation shaft 118 will cause the reaction member 112 and, thus, gear 108 to be momentarily rotated in a clockwise direction. Such a momentary clockwise rotation of gear 108 will, of course, cause gear 25 and all input gearing meshing therewith to be momentarily positively reverse rotated.

If a gear preselection has been made, momentarily reversing the input gearing, including the main shaft gears, will cause the preselected jaw clutch to cross synchronous and the preselected shift will be accomplished. If a preselection has not been made, the reverse rotation of the input gearing will, due to random frictional contact between the blockers and the second clutch members, tend to cause the blockers to set up in the downshifting position so that a later selected shift may be accomplished in conventional manner from the static condition.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit and the scope of the invention as claimed.

I claim:

1. A selectively actuatable mechanism adapted to be coupled with a driven shaft, said driven shaft driven by a one-way prime mover through a normally engaged selectively disengageable master clutch and adapted to be selectively engaged to a driven device, said mechanism effective when actuated and when said master clutch is disengaged to decelerate said driven shaft and when said master clutch is disengaged and said driven shaft is disengaged from said driven device or said given device is at rest to decelerate said driven shaft and to then momentarily positively rotate said driven shaft in the direction opposite the direction said driven shaft is rotated by said prime mover said mechanism comprising a housing, a friction coupling rotatable in said housing, one member of said coupling rotationally fixed to a gear adapted to be driven by said driven shaft and the other member of said coupling rotationally fixed to a reaction member, said reaction member axially and rotationally movable in said housing, axial movement of said reaction member toward said one coupling member effective to tend to rotate said reaction member in the rotational direction opposite the direction said one coupling member is normally rotated by said shaft, said reaction member coupled to an actuation shaft by a substantially helical spline, said splined connection permitting relative axial and rotational movement of said reaction member and said actuation shaft, said actuation shaft axially movable but rotationally fixed to said housing, an axial force motor comprising a pneumatic piston for urging said actuation shaft toward said first coupling member, control means for supplying pressurized fluid to said piston, said control means including a timer circuit for limiting the maximum period of time pressurized fluid can be supplied to said piston, a return biasing means for urging said coupling members apart.

2. The mechanism of claim 1 wherein the frictional force developed between the friction coupling members is greater than the torque required to cause relative rotation therebetween when said friction coupling members are in contact as a result of fluid pressure acting on said piston causing said actuation shaft to move toward said first friction member.

3. The mechanism of claim 1 wherein the frictional torque developed between said first and second friction coupling members as a result of said actuation member moving toward said first coupling member exceeds the torque applied to said reaction member by said helical splines tending to rotate said reaction member relative to said actuation shaft as a result of said actuation member moving toward said first coupling member whereby axial movement of said actuation shaft toward said first coupling member will first cause said first and second friction coupling members to be rotationally fixed relative to said actuation shaft and will then cause said first and second coupling members to be rotated relative to said actuation shaft.

4. The mechanism of claim 1 wherein said housing is substantially filled with lubricant.

5. The mechanism of claim 4 wherein said housing includes an idler gear in constant meshing engagement with said gear, said idler gear rotatably supported in a shrouded pumping chamber having an outlet.

6. The mechanism of claim 1 wherein said reaction member is positively limited by a stop member in its axial movement relative to said actuation shaft in the axial direction it would tend to move if driven by said coupling means in the rotational direction said first coupling member is normally driven by said driven shaft.

7. The mechanism of claim 6 wherein said reaction member is normally biased against said stop.

8. A mechanism adapted to be attached to a device having a driven shaft normally driven by a one-way prime mover through a friction master clutch and selectively engageable with a driven member, said mechanism comprising:

a housing attachable to said device;

a friction coupling rotatable in said housing, said friction coupling comprising a first friction member nonrotatably fixed to a gear adapted to be in constant meshing engagement with said driven shaft, said gear rotatable in said housing and a second friction member nonrotatably fixed to a reaction member supported for axial and rotational movement in said housing;

an actuation shaft axially movable and nonrotatably fixed in said housing, said actuation shaft being slidably received in a bore defined by said housing, said bore and actuation shaft defining a plurality of cooperating axially extending splines, said actuation shaft carrying said reaction member by a plurality of generally helical splines, relative movement of said actuation member toward said first friction member effective to move said second friction member into contact with said first friction member and to tend to rotate said second friction member in the rotational direction opposite the rotational direction said first friction member is normally rotated by said driven shaft whereby continued relative movement of said actuation shaft toward said first friction member is effective to decelerate said driven shaft when said master clutch is disengaged and to decelerate and then positively reverse the direction of rotation of said driven shaft when said master clutch is disengaged and said driven shaft is disengaged from said driven member or said driven member is at rest; and, axial force means for urging said actuation shaft toward said first friction member.

9. The mechanism of claim 8 wherein said axial force means is a fluid actuated piston and said mechanism includes a biasing means for urging said second friction member away from said first friction member.

10. The mechanism of claim 8 further including a gear pump idler gear constantly meshed with said gear, said idler gear rotatable within a pumping chamber defined by said housing.

11. The mechanism of claim 8 additionally including a control for controlling fluid flow to said piston, said control effective to supply fluid to said piston only upon disengagement of said master clutch.

12. The mechanism of claim 11 wherein said control includes a timing circuit effective to limit the maximum time period said piston is supplied with fluid.

13. The device of claim 11 wherein said master clutch is a normally engaged selectively disengaged clutch.

14. The mechanism of claim 8 wherein said reaction member is biased against a stop member limiting the axial movement of said reaction member relative to the actuation shaft in the axial direction said reaction member would tend to move if driven by said coupling means in the rotational direction said first coupling member is normally driven by said driven shaft.

15. The mechanism of claim 8 herein a portion of said device comprises a lubricant sump normally filled to a given level, said housing attachable to said device below said level and in fluid communication with said sump.

* * * * *